Mar. 20, 1923.

W. P. SHIPMAN 1,449,200

METHOD OF MAKING ANNEALING BOXES

Filed Apr. 23, 1921    2 sheets-sheet 1

INVENTOR.

Wm. P. Shipman
by his attorneys
Bakewell, Byrnes & Parmelee

Mar. 20, 1923.

W. P. SHIPMAN

METHOD OF MAKING ANNEALING BOXES

Filed Apr. 23, 1921.

INVENTOR.

Patented Mar. 20, 1923.

1,449,200

UNITED STATES PATENT OFFICE.

WILLIAM P. SHIPMAN, OF PITTSBURGH, PENNSYLVANIA, ASSIGNOR TO BLAW-KNOX COMPANY, OF PITTSBURGH, PENNSYLVANIA, A CORPORATION OF NEW JERSEY.

METHOD OF MAKING ANNEALING BOXES.

Application filed April 23, 1921. Serial No. 463,917.

*To all whom it may concern:*

Be it known that I, WILLIAM P. SHIPMAN, a citizen of the United States, residing at Pittsburgh, in the county of Allegheny and State of Pennsylvania, have invented a new and useful Method of Making Annealing Boxes, of which the following is a full, clear, and exact description, reference being made to the accompanying drawings, forming a part of this specification, in which—

The figures of the drawings are partly conventional.

This invention has relation to the manufacture of annealing boxes, and more particularly to annealing boxes made up of sheet metal plates united by welding, such boxes forming the subject matter of the patent application of Irvin F. Lehman, Serial No. 428,265, filed December 4, 1920.

The annealing box described and claimed in the said application is one which is entirely free from vertical or horizontal shoulders or seams of a character to form impinging surfaces for the heating flames when the box is in use. The present invention is designed to provide a simple and efficient method of making these boxes, and to provide for the manufacture of boxes of that type in which the life of the box is measured by the life of the metal composing it instead of by the life of the welds.

The nature of my invention will be best understood by reference to the accompanying drawings in which I have plainly illustrated a preferred method of carrying it out and which will now be described, it being premised, however, that various changes may be made in the details of the method without departing from the spirit and scope of the invention as defined in the appended claims.

Figure 1:
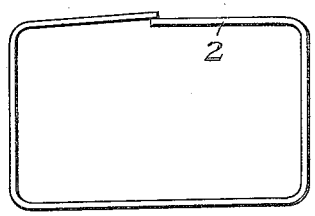
Figure 1 is an end view of a box body showing one step in the operation.
Figure 2:
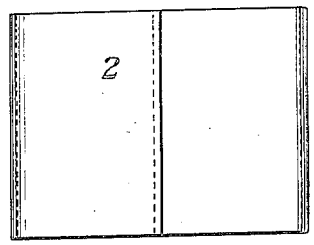
Figure 2 is a plan view of the same.

In accordance with my invention I first form a blank for the box body by bending a plate or sheet of metal into the general rectangular form shown in Figure 1, with the edges of the sheet brought together and overlapped at an intermediate portion of one side of the box body. The sheet is originally of such dimensions that when the box body is squared up to its finished dimensions, with its sides and ends respectively parallel to each other, the extent of the overlap is approximately equal to the thickness of the metal of the sheet. Figures 1 and 2 illustrate the box body blank 2 which is so formed.

Figure 3:
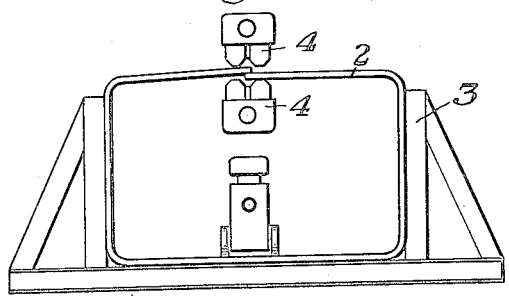
Figure 3 is an end view showing another step.
Figure 4:
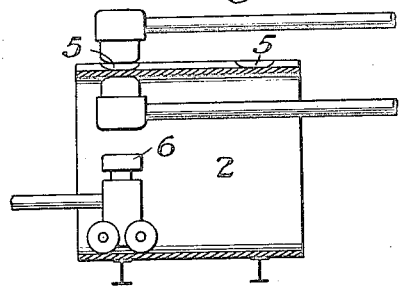
Figure 4 is a longitudinal section showing another step.
Figure 5:
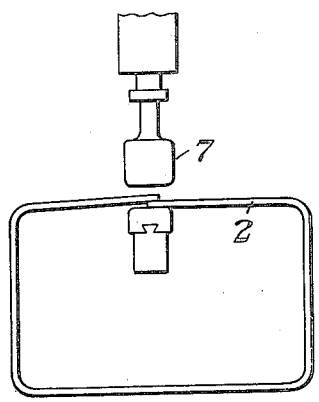
Figure 5 is an end view.
Figure 6:
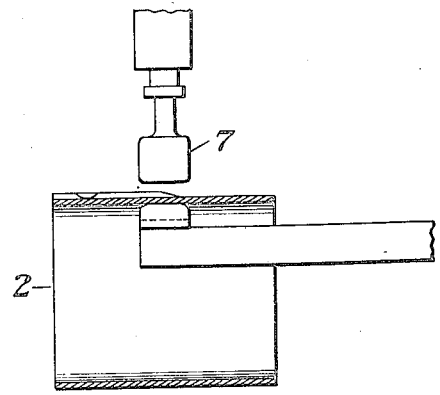
Figure 6 is a longitudinal section illustrating a welding operation.
Figure 7:
Figure 7 is a sectional view showing the character of one of the finished welds.

The next step is to suitably square up the blank which is usually done by placing it in a squaring frame 3 which will insure its sides and ends being brought into substantial parallelism. The blank, either while still held in the squaring frame, or while otherwise still held in the squared position, is then ready for welding. In the construction illustrated in Figures 3 and 4, instead of taking the blank to the welder while still in the squaring frame, it is secured in its squared up position by first applying suitable burners 4 to the overlapped edge portions and bringing limited areas thereof to welding heat, after which a series of tack welds 5 are made by any suitable apparatus, as illustrated in Figure 4. This apparatus may include a vertically adjustable anvil or support 6 of any desired construction. The box is then taken to any suitable welding apparatus 7, such as illustrated in Figures 5 and 6. An apparatus suitable for this purpose is disclosed in my Patent No. 1,412,066, of April 11, 1922. After being brought to a welding temperature the overlapped portions of the blank are welded into a homogeneous joint in which the thickness of the metal throughout the joint is substantially the same as that elsewhere in the sheet or plate. The character of the finished weld is indicated in Figure 7. The excess metal due to the overlap is partially taken care of by the scale which flies off during the hammer welding operation and in part by a slight elongation of the box in the direction of the length of the weld, and which elongation is such that it can be sheared off. There will also usually be a slight thickening of the metal at the weld but such thickening does not very appreciably increase the thickness at this point.

Figure 8:
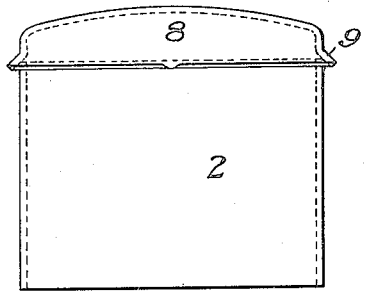
Figure 8 is a side view.
Figure 9:
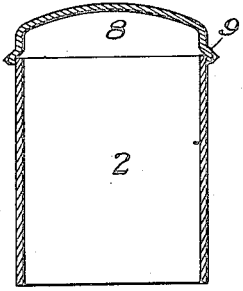
Figure 9 is a transverse vertical section illustrating a subsequent step.

The welded body is next provided with a cover 8 which is placed over one of the open ends of the body and which is of flanged form. That is to say, it has a downwardly extending flange which is arranged to overlap the upper edge portion of the box body upon which it seats. In Figures 8 and 9 I have shown the overlapping portion 9 of this flange as having a sharp outward flare. While this is not absolutely necessary, it is a feature of considerable advantage since it enables the hammering and welding area to be localized and restricted to this flared portion and thus prevents hammering of the metal except over the welding area. The extent of overlapping is here again substantially equal to the thickness of the metal and the character of the weld is the same as that shown in Figure 7, there being no material thickening of the metal in the finished weld.

Figure 10:
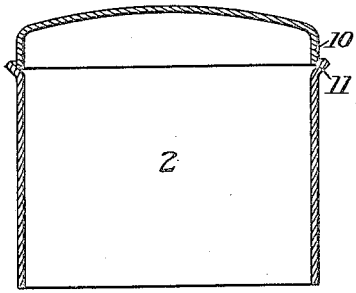
Figure 10 is a longitudinal vertical section showing a modification.

Instead, however, of flaring the flange of the cover and causing it to seat exteriorly of the upper edge of the body, as shown in Figures 8 and 9, the cover flange may be unflared, as shown at 10 in Figure 10, and may seat inside of the outwardly flared upper edge 11 of the body in which case the weld is made in substantially the same manner as with the construction shown in Figures 8 and 9.

Figure 11:
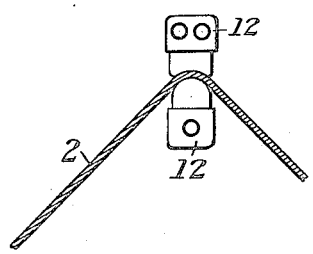
Figure 11 is a fragmentary cross-sectional view.
Figure 12:
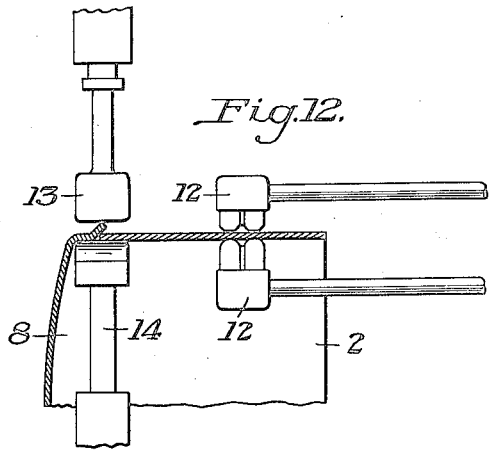
Figure 12 is a longitudinal sectional view showing the corner weld.
Figure 13:
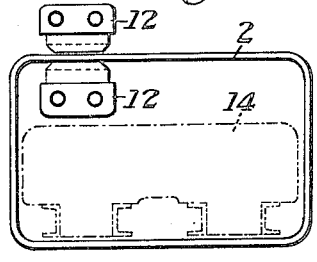
Figure 13 is an end view.
Figure 14:
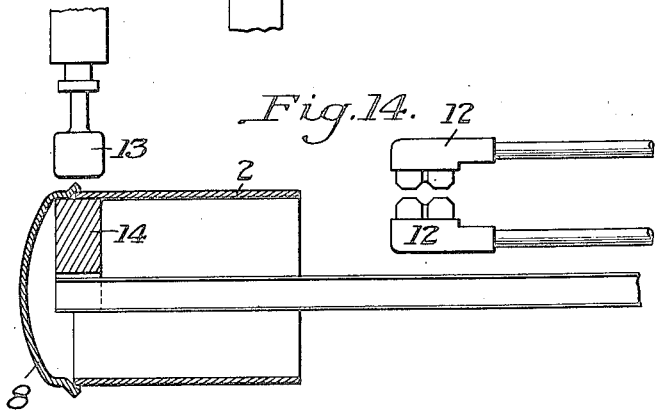
Figure 14 is a longitudinal section, with certain parts in elevation, showing a subsequent welding operation.

Considerable difficulty has been experienced prior to my invention in attempting to form a continuous weld of this character between two members of angular cross-section, owing to the fact that some slight movement of the metal occurs in the front of the welding hammer which usually gives difficulty at the corners of the structure. I have found that this difficulty may be avoided by first partially welding the cover to the top by relatively short welds, and then subsequently completing the welding by another series of welds made between the first welds. Preferably, although not necessarily, the first short welds are made at the corners, as illustrated in Figures 11 and 12. In these figures, 12 indicates suitable burners, 13 a welding hammer, and 14 an anvil supporting the metal interiorly of the box. After the corner welds have been completed, the straight portions of the welds between the corners are then successively made as illustrated in Figures 13 and 14. These welds may be effected by the same apparatus as that used in making the corner welds. The portions to be welded are first subjected to the heating action of the burners 12 of the furnace and the portions thus heated are then brought under the action of the hammer 13. In making the welds secure I preferably, although not necessarily, employ water gas as the welding medium since I have found that by the use of this gas there is less danger of burning and injuring the life of the metal.

Annealing boxes constructed in accordance with this invention have gone quite extensively into practical use, which has demonstrated that, in effect, the boxes have the same degree of durability that they would have if formed from a single piece of metal. That is to say, the character of the hammered welds which are made is such that the life of the metal at the welds is equal to that of the metal elsewhere in the box, and the boxes, therefore, do not fail in service because of failure at the welds.

I claim:

1. The herein described method of forming sheet metal annealing boxes, which comprises providing a sheet metal box body having open ends and of rectangular cross-section, applying to one of the open ends of said body a rectangular top member having a downwardly extending flange, overlapping said flange with the upper edge of the box body to an extent substantially equal to the thickness of the metal of one of said parts, effecting a partial joining of the top portion and body by relatively short welds at separated joints, and then completing the joining operation by subsequent welds made successively between the first welds, while maintaining the original cross sectional area of the box, substantially as described.

2. The herein described method of forming sheet metal annealing boxes, which comprises providing a sheet metal box body having open ends and of rectangular cross-section, applying to one of the open ends of said body a top member having a downwardly extending flange, overlapping said flange with the upper edge of the box body to an extent substantially equal to the thickness of the metal of one of said parts, then successively welding the corner portions only of said parts, and subsequently welding successively the straight portions at the sides and ends of the box intermediate the previously welded corner portions, substantially as described.

3. In the method of forming annealing boxes, the steps consisting in forming a rectangular body, placing a flanged top member on one open end of the said body, welding said member to the body at the corners only, and then continuously welding said member to the body intermediate the corner welds, substantially as described.

4. In the method of forming annealing boxes, the steps consisting in forming a rectangular body, placing a flanged top member on one open end of said body, welding said member to the body at the corners only, and then continuously hammer welding said member to the body intermediate the corner welds to reduce the entire thickness at the weld to substantially the thickness of the body member, substantially as described.

In testimony whereof, I have hereunto set my hand.

WILLIAM P. SHIPMAN.